(12) United States Patent
Nishitani et al.

(10) Patent No.: US 6,523,752 B2
(45) Date of Patent: Feb. 25, 2003

(54) RFID READER AND COMMUNICATIONS APPARATUS, AND DELIVERY ARTICLE SORTING METHOD AND SYSTEM USING RFID READER AND COMMUNICATIONS APPARATUS

(75) Inventors: Hiroyuki Nishitani, Kanagawa (JP); Toshinori Kon, Kanagawa (JP); Shuji Ito, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/792,142

(22) Filed: Feb. 22, 2001

(65) Prior Publication Data

US 2001/0052544 A1 Dec. 20, 2001

(30) Foreign Application Priority Data

Feb. 23, 2000 (JP) .......................................... 2000-045896

(51) Int. Cl.$^7$ .................................................. G06K 7/10
(52) U.S. Cl. ................................. 235/462.44; 235/375
(58) Field of Search ................................ 235/375, 380, 235/383, 385, 381, 382.5, 426.01, 472.01–472.03, 492, 493; 340/572.4, 10.1, 505; 705/28

(56) References Cited

U.S. PATENT DOCUMENTS

| | | | | |
|---|---|---|---|---|
| 5,329,106 A | * | 7/1994 | Hone et al. | 235/472 |
| 5,565,846 A | * | 10/1996 | Geiszler et al. | 340/572 |
| 5,610,387 A | * | 3/1997 | Bard et al. | 235/472 |
| 5,771,657 A | * | 6/1998 | Lasher et al. | 53/55 |
| 6,201,474 B1 | * | 3/2001 | Brady et al. | 340/572.8 |
| 6,232,870 B1 | * | 5/2001 | Garber et al. | 340/10.1 |
| 2001/0013830 A1 | * | 8/2001 | Garber et al. | 340/572.4 |
| 2002/0008623 A1 | * | 1/2002 | Garber et al. | 340/272.1 |

FOREIGN PATENT DOCUMENTS

JP          2000-215267 A  *  4/2000

* cited by examiner

Primary Examiner—Thien M. Le
(74) Attorney, Agent, or Firm—Pearne & Gordon LLP

(57) ABSTRACT

Information such as the delivery request registration number and the address and the name of a receiver registered to the RFID label affixed on a delivery article is read via RFID reader/radio communications apparatus (400) attached to an arm of a sorting worker (31). The information is sent via radio communications apparatus, and a guidance instruction on the carrying palette for sorting where the delivery article is to be put away is given on radio incoming information display apparatus (500) attached to a carrying palette for sorting (700) via blinking of a guidance lamp (600).

13 Claims, 13 Drawing Sheets

RFID READER AND COMMUNICATIONS APPARATUS, AND DELIVERY ARTICLE SORTING METHOD AND SYSTEM USING RFID READER AND COMMUNICATIONS APPARATUS

BACKGROUND OF THE INVENTION

The present invention relates to RFID reader/communications apparatus used in delivery sorting of delivery articles such as parcel post and home delivery freight, and a delivery article handling method and a delivery article handling system using the RFID reader/communications apparatus.

Conventionally, in delivery sorting of delivery articles such as parcel post and home delivery freight, a worker used to put away delivery articles in destination-based carrying pallets while reading addresses and address codes by using a bar code reader to read bar codes on slips or labels with bar codes affixed or attached to delivery articles such as parcel post and home delivery freight. Reading of bar codes was performed mainly for acquisition of information serving as evidence for handling processing and tracking data, not for work such as delivery sorting.

As such, according to methods and technologies in the related art in delivery sorting of delivery articles such as parcel post and home delivery freight, reading of bar codes was mainly performed for acquisition of information serving as evidence for handling processing and tracking data. There were no perfect means for preventing errors in destination sorting work.

SUMMARY OF THE INVENTION

The invention aims at providing RFID reader/communications apparatus and a delivery article handling method and a delivery article handling system using the RFID reader/communications apparatus whereby reading of bar codes is used for guidance and checkup of sorting work as well as acquisition of information serving as evidence for handling processing and tracking data and even unskilled worker can perform sorting work quickly, correctly and easily.

The first aspect of the invention is RFID reader/communications apparatus comprising a power feeding section attached to a waist belt for feeding power, a flexible antenna provided on an arm belt, a power supply section for receiving power from the power feeding section, and a control circuit for controlling the RFID reader/communications apparatus main unit provided on the arm belt. This configuration has an advantage that even an unskilled worker with the arm belt attached on his/her arm can perform sorting work correctly.

The second aspect of the invention is RFID reader/communications apparatus according to the first aspect of the invention, comprising a flexible antenna whose flexible substrate having a printed antenna circuit pattern thereon is glued to an arm belt via flexible adhesive. The apparatus, attached to an arm of a sorting worker that handles delivery articles, flexibly keeps up with the movement of the arm.

The third aspect of the invention is RFID reader/communications apparatus according to the second aspect of the invention, wherein the control circuit comprises an antenna circuit pattern connected by a connection cable via a connector. The apparatus, attached to an arm of a sorting worker that handles delivery articles, flexibly keeps up with the movement of the arm.

The fourth aspect of the invention is a delivery article handling method comprising a step for reading information such as the delivery request registration number and the address and the name of a receiver registered to the RFID label affixed on a delivery article, a step for determining in which carrying palette for sorting the delivery article is to be put away by using this information, a step for sending the determination result to radio incoming information display apparatus attached to the carrying palette for sorting via radio communications means, and a step for reporting the carrying palette for sorting where the delivery article is to be put away to a worker. This method has an advantage that information on the RFID label attached to the delivery article is read via RFID reader/radio communications apparatus and the carrying palette for sorting where the delivery article is to be put away is determined via destination information in the information for guidance via radio communications, thus allowing even an unskilled worker to perform sorting work correctly.

The fifth aspect of the invention is a delivery article handling system comprising RFID reader/radio communications apparatus incorporating an RFID communication antenna in a flexible belt that can be attached to an arm of a delivery article sorting worker, an RFID label affixed on a delivery article where information such as the delivery request registration number and the address and the name of a receiver is registered, carrying palettes for sorting that accommodate the delivery articles by sorting and carry the delivery articles, and radio incoming information display apparatus attached to the carrying palette for sorting comprising a guidance lamp that blinks, wherein the RFID reader/radio communications apparatus reads various information registered to the RFID label, determines in which carrying palette for sorting the delivery article is to be put away by using this information, and sends the determination result to the radio incoming information display apparatus attached to the carrying palette for sorting via the radio communications means, and wherein the radio incoming information display apparatus receives the determination result and causes the guidance lamp to blink and reports the carrying palette for sorting where the delivery article is to be put away to the worker. This system has an advantage that information on the RFID label attached to the delivery article is read via radio communications apparatus and the target carrying palette for sorting is determined via destination information in the read information for guidance via radio communications, thus allowing even an unskilled worker to perform sorting work correctly.

The sixth aspect of the invention is RFID reader/communications apparatus comprising a power feeding section attached to a waist belt for feeding power, a flexible antenna whose flexible substrate having a printed antenna circuit pattern thereon is glued to an arm belt via flexible adhesive, a control circuit for controlling the RFID reader/communications apparatus main unit provided on the arm belt, a connection cable for connecting the control circuit with the flexible antenna, and a power supply section provided on the arm belt for receiving power from the power feeding section. This configuration has an advantage that the apparatus is separately composed of an antenna glued to an arm belt and a connection cable for connecting the control circuit with the flexible antenna so as to increase the freedom of apparatus attachment on an arm of a sorting worker and freedom of apparatus configuration.

The seventh aspect of the invention is a delivery article handling method comprising a step for reading information such as the delivery request registration number and the address and the name of a receiver registered to the RFID label affixed on a delivery article, a step for determining in which carrying palette for sorting the delivery article is to be put away by using this information, and a step for giving a sorting guidance via voice on the carrying palette for sorting where the delivery article is to be put away. This method has an advantage that information on the RFID label attached to the delivery article is read via RFID reader/voice communications apparatus attached to an arm of a delivery article sorting worker and the carrying palette for sorting where the delivery article is to be put away is determined via destination information in the information for guidance via voice, thus allowing even an unskilled worker to perform sorting work correctly.

The eighth aspect of the invention is a delivery article handling system comprising RFID reader/voice communications apparatus incorporating an RFID communication antenna in a flexible belt that can be attached to an arm of a delivery article sorting worker, an RFID label affixed on a delivery article where information such as the delivery request registration number and the address and the name of a receiver is registered, and carrying palettes for sorting that accommodate the delivery articles by sorting and carry the delivery articles, wherein the RFID reader/voice communications apparatus reads various information registered to the RFID label, determines in which carrying palette for sorting the delivery article is to be put away by using this information, and giving a sorting guidance via voice on the carrying palette for sorting where the delivery article is to be put away. This method has an advantage that information on the RFID label attached to the delivery article is read via RFID reader/voice communications apparatus attached to an arm of a delivery article sorting worker and the carrying palette for sorting where the delivery article is to be put away is determined via destination information in the information for guidance via voice, thus allowing even an unskilled worker to perform sorting work correctly.

The ninth aspect of the invention is a delivery article handling method comprising a step for reading information such as the delivery request registration number and the address and the name of a receiver registered to the RFID label affixed on a delivery article, a step for determining in which carrying palette for sorting the delivery article is to be put away by using this information, a step for giving a sorting guidance via voice communications apparatus on the carrying palette for sorting where the delivery article is to be put away, a step for sending the determination result to radio incoming information display apparatus attached to the carrying palette for sorting via radio communications means, and giving a guidance via blinking of the guidance lamp on the radio incoming information display apparatus. This method has an advantage that the RFID reader/communications apparatus is equipped with both the function of RFID reader/voice communications apparatus and the function of RFID reader/radio communications apparatus and serves as more excellent RFID reader/communications apparatus having both merits, thus allowing correct and quick sorting work.

The tenth aspect of the invention is a delivery article handling system comprising RFID reader/communications apparatus incorporating an RFID communication antenna in a flexible belt that can be attached to an arm of a delivery article sorting worker, an RFID label affixed on a delivery article where information such as the delivery request registration number and the address and the name of a receiver is registered, carrying palettes for sorting that accommodate the delivery articles by sorting and carry the delivery articles, and radio incoming information display apparatus attached to the carrying palette for sorting comprising a guidance lamp that blinks, wherein the RFID reader/communications apparatus has a reader/radio communications function and a reader/voice communications function and reads various information registered to the RFID label, determines in which carrying palette for sorting the delivery article is to be put away by using this information, and gives a sorting guidance via voice communications apparatus on the carrying palette for sorting where the delivery article is to be put away, and sends the determination result to radio incoming information display apparatus attached to the carrying palette for sorting via radio communications means, wherein the radio incoming information display apparatus receives the determination result to cause the guidance lamp to blink and wherein the worker puts away a delivery article in the carrying palette for sorting according to the sorting guidance via voice and the sorting guidance via a lamp. This system has an advantage that the RFID reader/communications apparatus is equipped with both the function of RFID reader/voice communications apparatus and the function of RFID reader/radio communications apparatus and serves as more excellent RFID reader/communications apparatus having both merits, thus allowing correct and quick sorting work.

DETAILED DESCRIPTION OF THE PREFERRED EMBODIMENT

Embodiments of the invention will be explained referring to drawings.

First Embodiment

Figure 1:
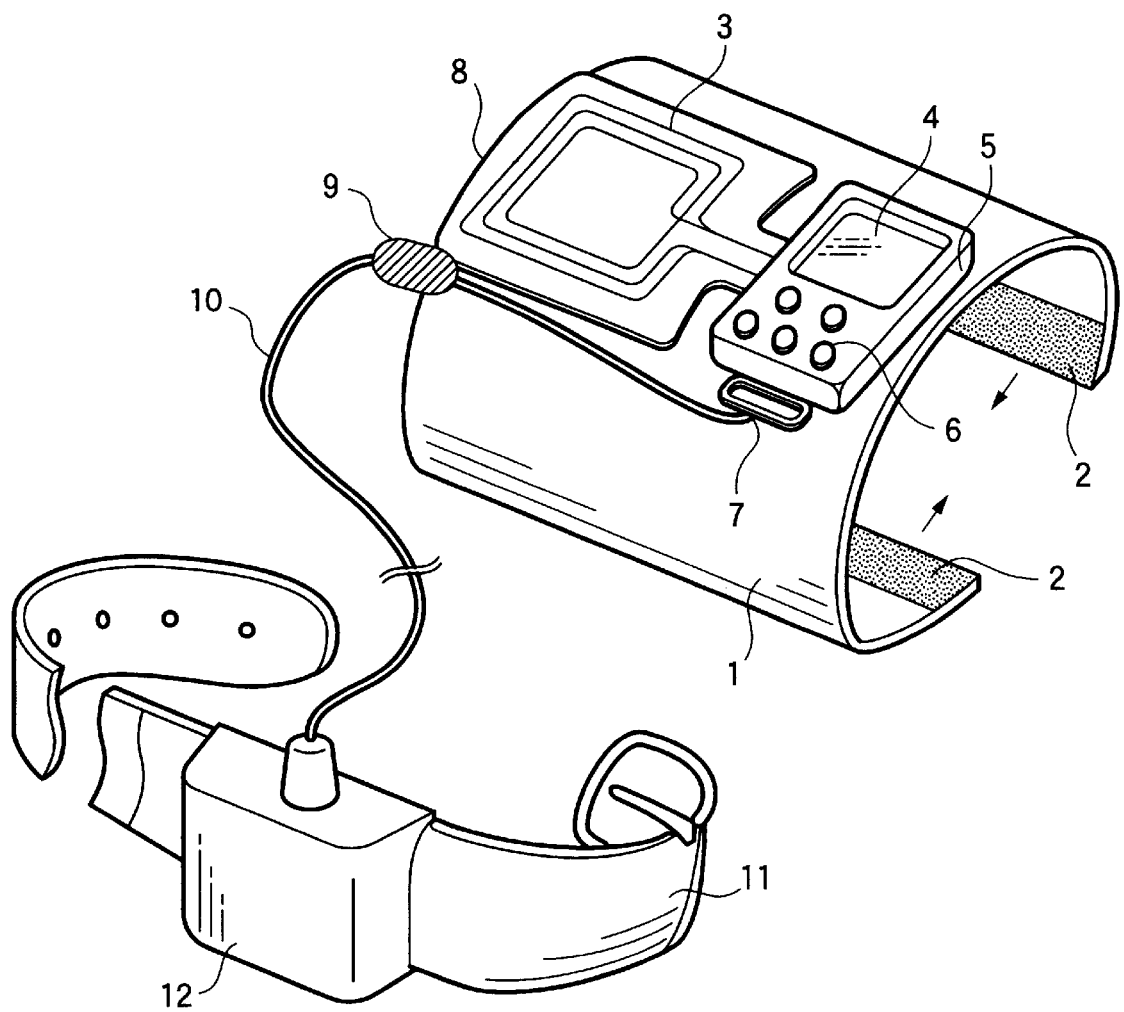
FIG. 1 is a schematic view showing the configuration of RFID reader/radio communications apparatus according to the first embodiment of the invention.

FIG. 1 is a schematic view showing the configuration of RFID reader/radio communications apparatus according to the first embodiment of the invention. In FIG. 1, the RFID (Radio Frequency Identification) reader/radio communications apparatus is mounted on an arm belt 1 so as to be attached to an arm of a worker. On the inner surface of the arm belt 1 is provided a fabric fastener 2 and on the outer surface are provided a flexible antenna 3, a display 4 such as an LCD, a control circuit 5 composed of a CPU, operation buttons 6, and a power supply 7 that constitute RFID reader/radio communications apparatus. While not shown, functional blocks of the flexible antenna 3, the display 4 such as an LCD, the control circuit 5 composed of a CPU, the operation buttons 6, and the power supply 7 that constitute RFID reader/radio communications apparatus are electrically connected inside. The flexible antenna 3 is adapted to be mounted on a flexible substrate 8. From the power supply 7 is arranged a feeder cable to a power connector 9. The power connector is connected via a feeder cable 10 to power feeding means 12 attached to a waist belt 11.

Figure 2:
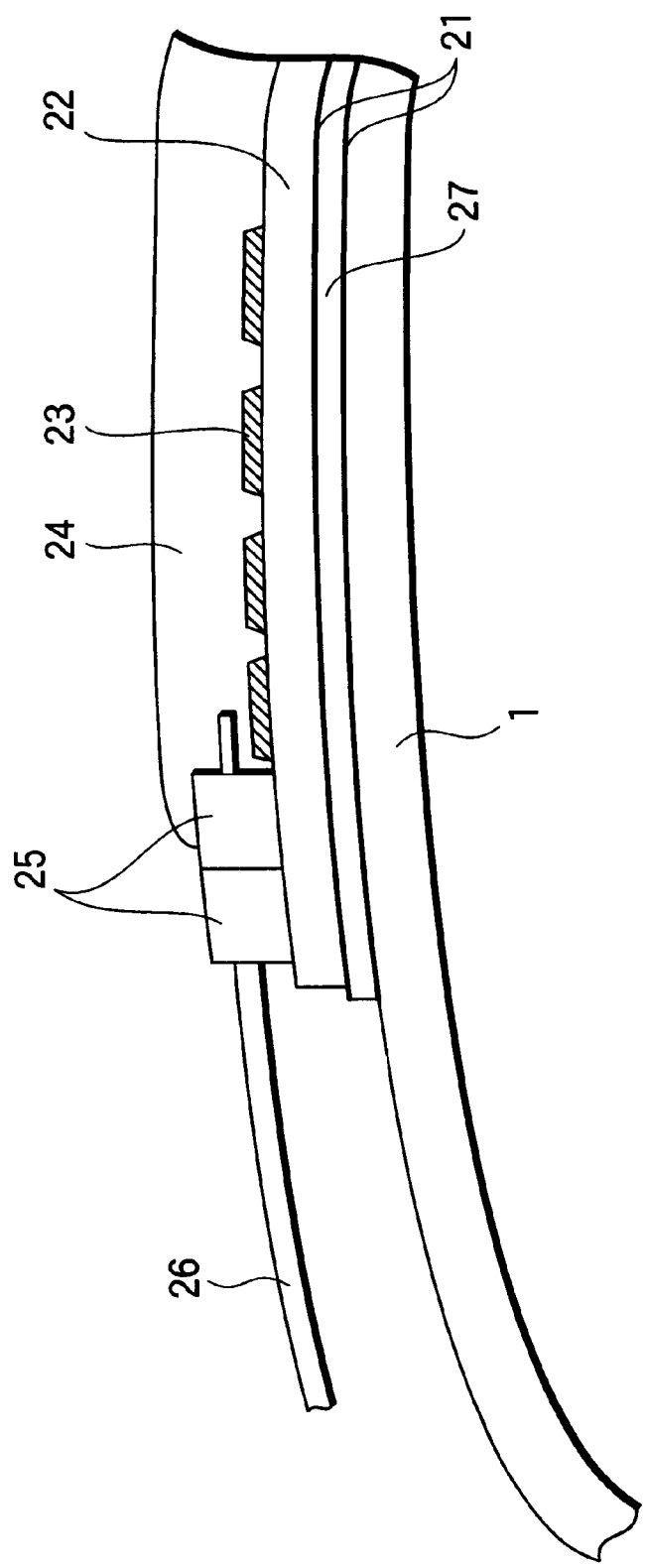
FIG. 2 is an enlarged sectional view for explaining the structure of the flexible antenna shown in FIG. 1.

FIG. 2 is an enlarged sectional view for explaining the structure of the flexible antenna 3 shown in FIG. 1. In FIG. 2, the flexible antenna 3 is composed of a metallic layer 27 glued/laminated via a flexible adhesive layer 21 onto an arm belt composed of a flexible material such a s a fabric, artificial leather and resin sheet, a flexible substrate 22 composed of a substrate material such as polyamide where an antenna circuit pattern 23 is printed being glued/laminated on the metallic layer 27, and a coating cover 24 on the flexible substrate 22. The metallic layer 27 has an effect of reflecting and amplifying radio waves/magnetic fields radiated from the antenna circuit pattern 23.

The antenna circuit pattern 23 is connected to a connector 25 coupled to a connection cable 26. The connection cable 26 is connected to the control circuit 5. Since the flexible antenna 3 provided with the antenna circuit pattern 23 has such a configuration, the antenna 3 flexibly keeps up with the movement of an arm of a sorting worker that handles delivery articles when attached thereto.

Figure 3:
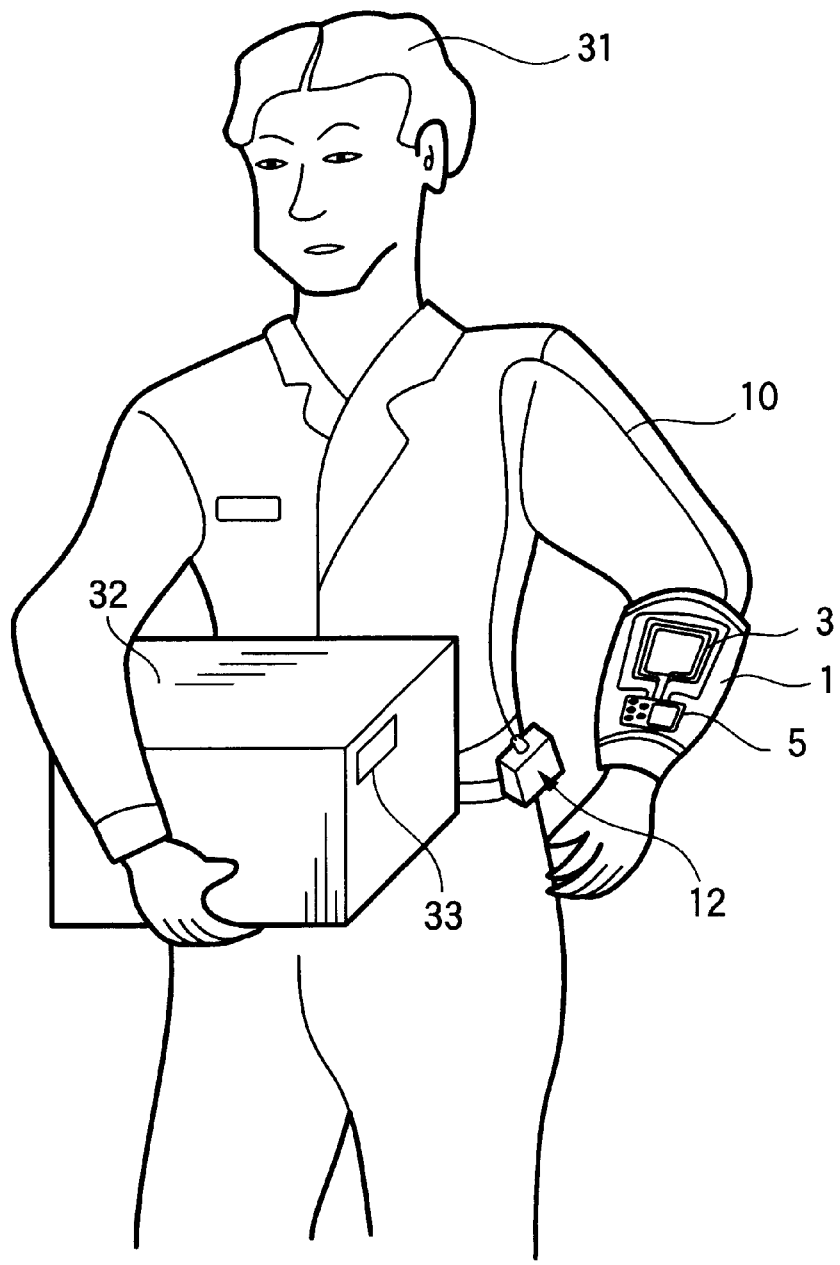
FIG. 3 shows the sorting of delivery articles such as parcel post with RFID reader/radio communications apparatus according to the first embodiment shown in FIG. 1 attached to a sorting worker.

FIG. 3 shows the sorting of delivery articles such as parcel post with RFID reader/radio communications apparatus according to the first embodiment shown in FIG. 1 attached to a sorting worker. In FIG. 3, the RFID reader/radio communications apparatus mounted on the arm belt 1 is attached to an arm of a sorting worker 31 and power is fed from the power feeding means 12 attached to the waist belt.

When the sorting worker 31 brings the RFID reader/radio communications apparatus close to an RFID label 33 affixed on a delivery article 32 such as parcel post while lifting up the delivery article 32 such as parcel post with his/her arms, the sorting work information registered to the RFID label 33 is read and sent to radio incoming information display apparatus (not shown) via radio communications apparatus. The sorting worker 31 puts away delivery articles such as parcel post in carrying palettes for sorting according to the blinking of the guidance lamp on the radio incoming information display apparatus.

Figure 4:
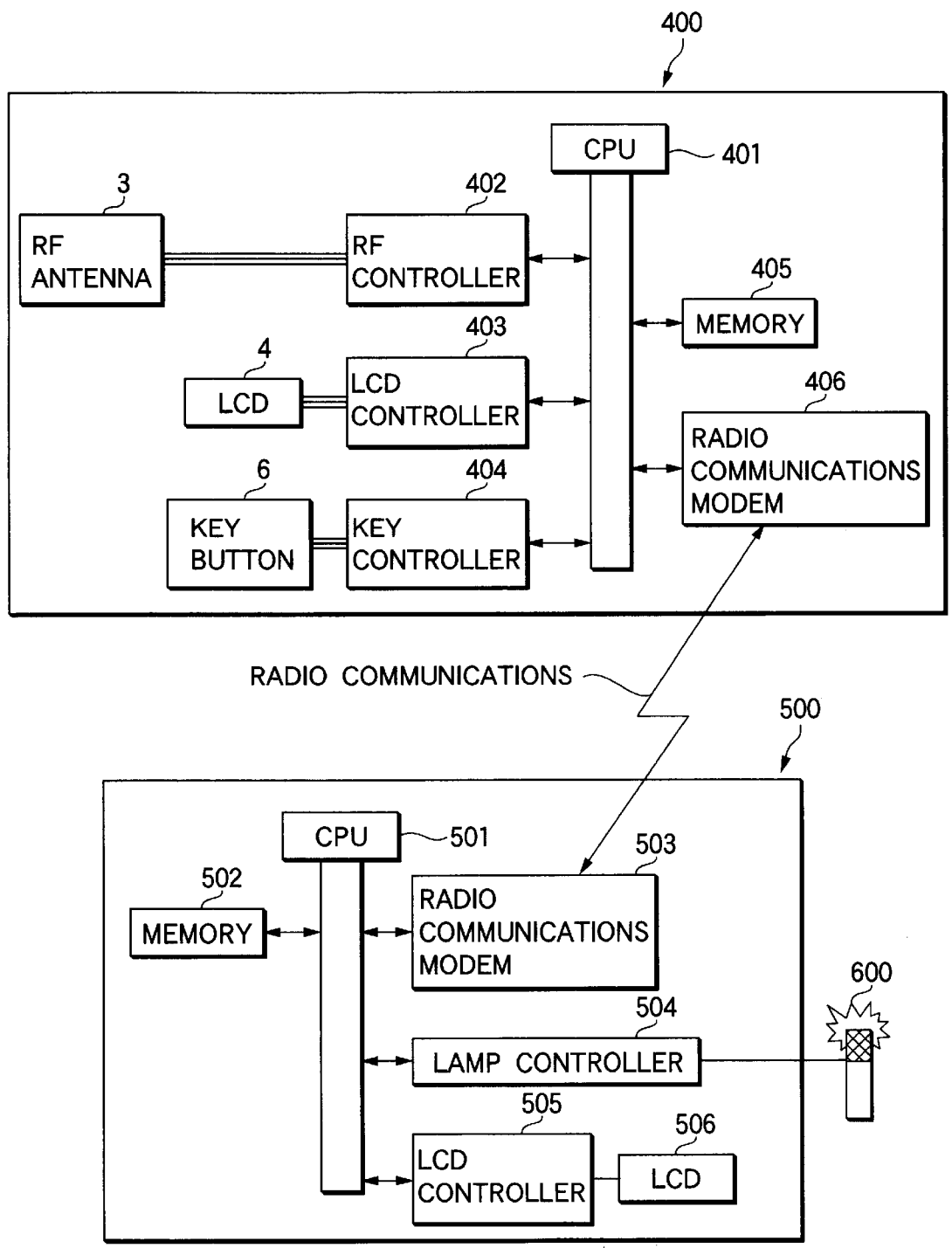
FIG. 4 is a block diagram of RFID reader/radio communications apparatus according to the first embodiment and a block diagram of a radio incoming information terminal.

FIG. 4 is a block diagram of RFID reader/radio communications apparatus according to the first embodiment and a block diagram of a radio incoming information terminal. In FIG. 4, RFID reader/radio communications apparatus 400 shows a block diagram for realizing RFID reader/radio communications apparatus shown in FIG. 1 in terms of circuits. Components related to the power in FIG. 1 is not shown.

RFID reader/radio communications apparatus 400 in FIG. 4 comprises an RF controller 402 for controlling the RFID communication antenna (flexible antenna) 3, an LCD (liquid crystal display) controller 403 for controlling the LCD 4, a key controller 404 for controlling key buttons 6, a memory 405, and radio communications modem 406 for performing transmission/reception of radio data with radio incoming information display apparatus 500, all of the components connected via a bus to a CPU 401.

The radio incoming information display apparatus 500 comprises a memory 502, a radio communications modem 503 for performing transmission/reception of radio data with RFID reader/radio communications apparatus 400, a lamp controller for controlling a pilot (guidance) lamp 600, and an LCD (liquid crystal display) controller 505 for controlling the LCD 506, all of the components connected via a bus to a CPU 501.

Figure 5:
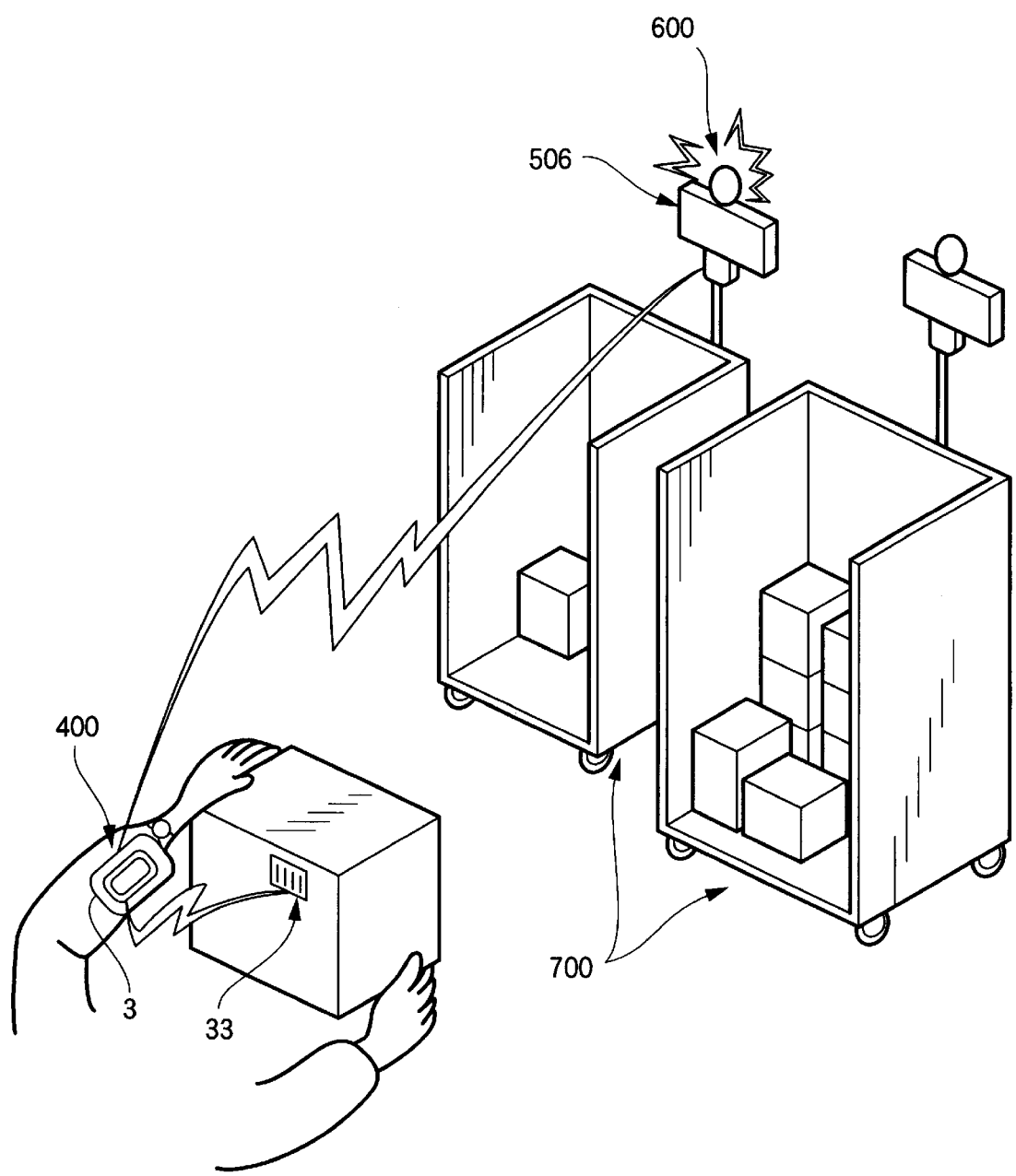
FIG. 5 is a schematic view of a delivery article handling system using RFID reader/radio communications apparatus according to the first embodiment of the invention shown in FIG. 1.

FIG. 5 is a schematic view of a delivery article handling system using RFID reader/radio communications apparatus according to the first embodiment of the invention shown in FIGS. 1 through. 3. In FIG. 5, a sorting worker uses the RFID reader/radio communications apparatus 400 with the flexible antenna 3 embedded in the flexible belt 1 to read the information on the RFID label 33. On the RFID label 33 affixed on the delivery article is input information such as the delivery request registration number and the address and the name of a receiver. The RFID reader/radio communications apparatus 400 that read such information uses the radio communications function to send the read information to the radio incoming information display apparatus 500. Sending of the read information is carried out by a radio communications modem 406 provided in the RFID reader/radio communications apparatus 400.

The information sent from the radio communications modem 406 provided in the RFID reader/radio communications apparatus 400 is received by the modem 503 provided in the radio incoming information display apparatus 500 and decoded by the main circuit 501 such as a CPU provided in the radio incoming information display apparatus 500. In case the received information contains information on the carrying palette for sorting where the delivery article is to be put away, the lamp 600 on the radio incoming information display apparatus 500 is made to blink, and the LCD (liquid crystal display) 506 provided in the radio incoming information display apparatus 500 is made to display the destination as required to guide a sorting worker to a carrying palette for sorting 700 and the sorting worker puts away the delivery article in the carrying palette for sorting 700.

In this way, for RFID reader/radio communications apparatus according to the first embodiment, the information on the RFID label affixed on the delivery article is read via RFID reader/radio communications apparatus attached to an arm of a worker in case the worker has lifted up the delivery article. Destination information in the read information is sent and the corresponding guidance lamp on the radio incoming information display apparatus blinks via the information to indicate the carrying palette for sorting where the delivery article is to be put away, and sorting work is performed according to the indication. This sequence has an advantage that unskilled worker can perform sorting work correctly.

Figure 6:
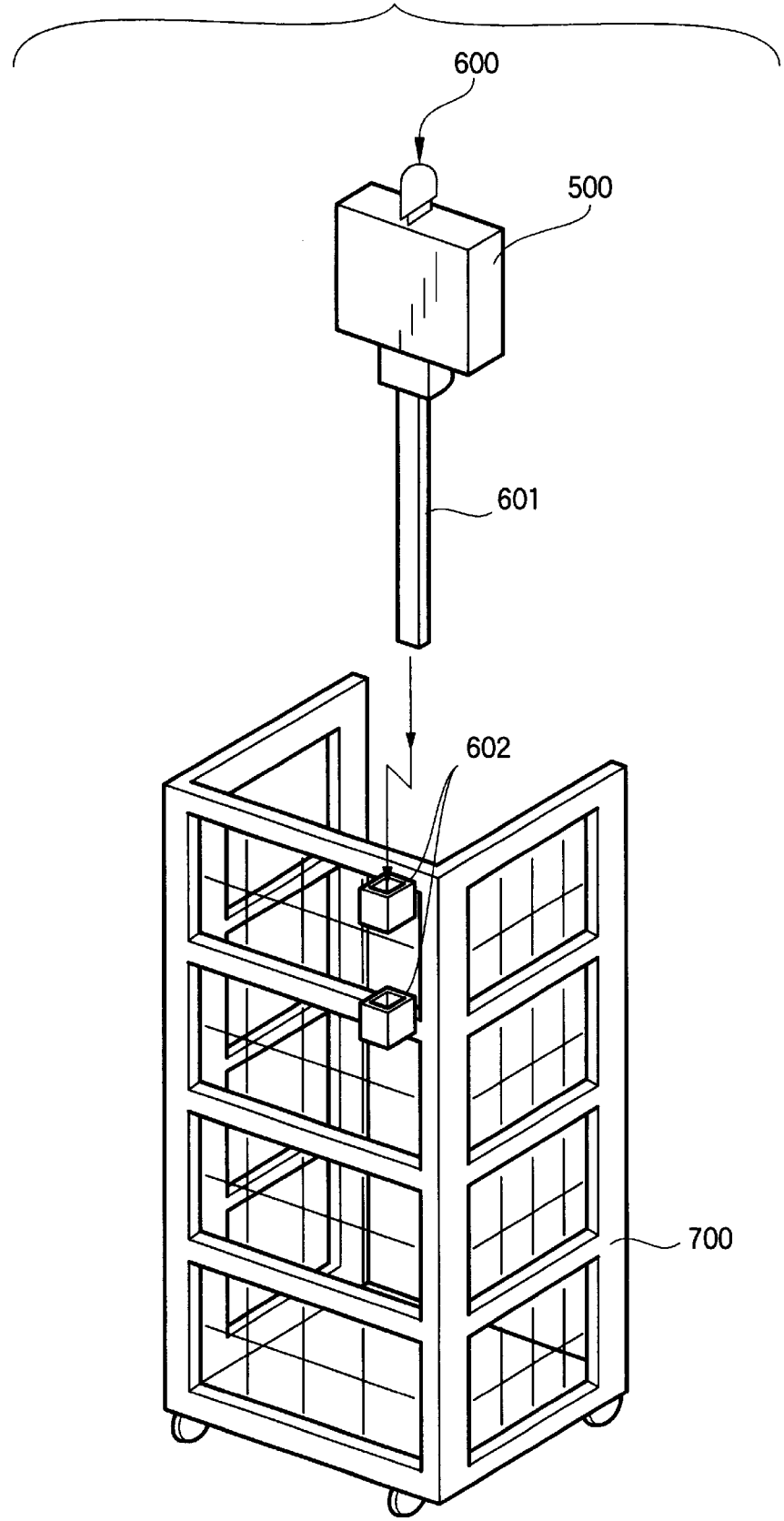
FIG. 6 shows an example of attaching configuration assumed when radio incoming information display apparatus according to the first embodiment of the invention is attached to a carrying palette for sorting.

FIG. 6 shows an example of attaching configuration assumed when radio incoming information display apparatus according to the first embodiment of the invention is attached to a carrying palette for sorting. As shown in FIG. 6, the radio incoming information display apparatus 500 is provided with a guidance lamp 600 protruding out of the enclosure and a support 601 is extended. The support 601 engages in a holder for radio incoming information display apparatus 602 provided at the rear of the carrying palette for sorting 700. The holder for radio incoming information display apparatus 602 provided at the rear of the carrying palette for sorting 700 is variably equipped with a plurality of attaching positions according to the volume of delivery articles and ease of work for the sorting worker.

Figure 7:
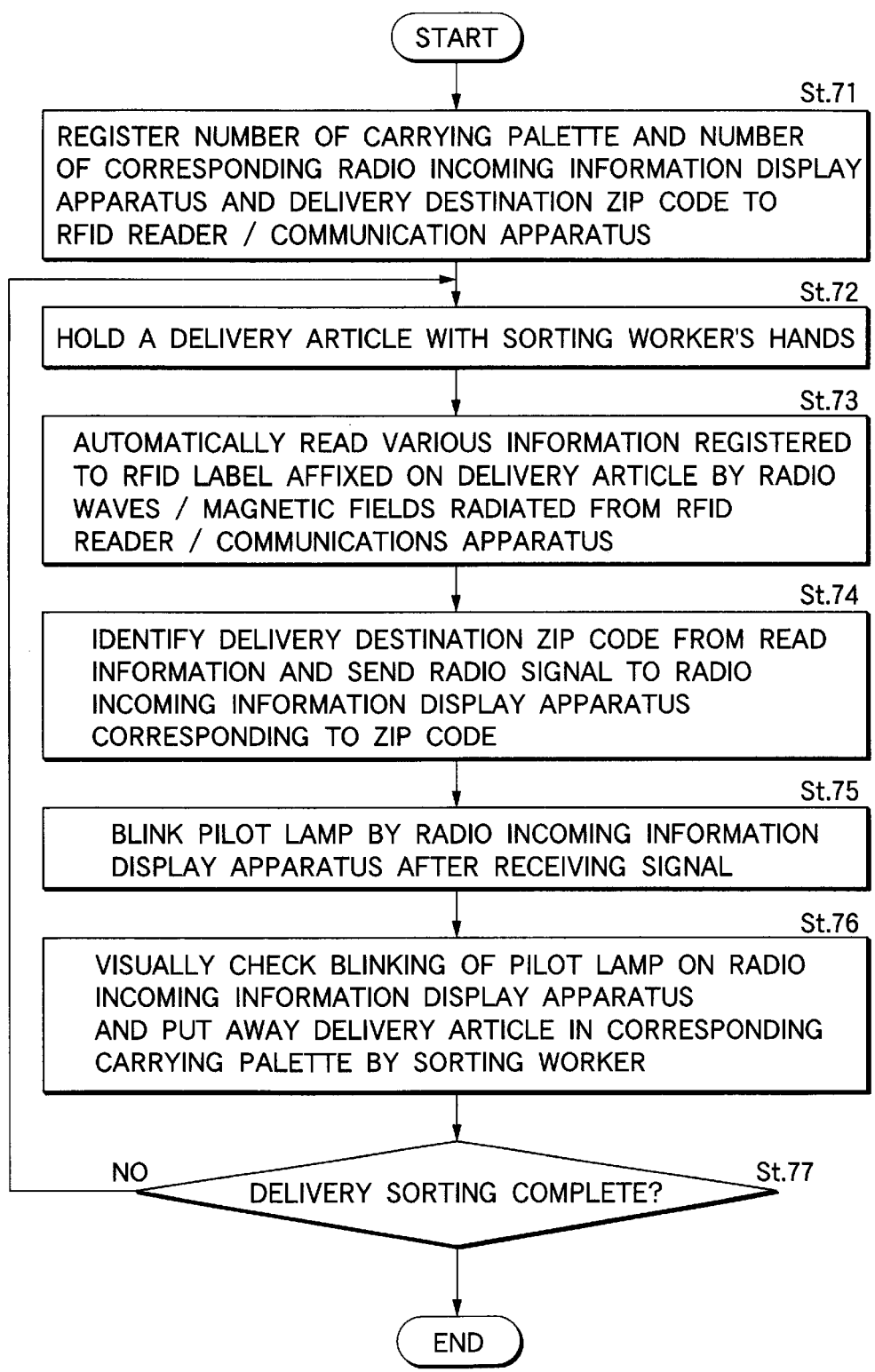
FIG. 7 is a flowchart explaining the operation of a delivery article handling system using RFID reader/communications apparatus according to the first embodiment.

FIG. 7 is a flowchart explaining the operation of a delivery article handling system using RFID reader/communications apparatus according to the first embodiment of the invention. In step 71 in FIG. 7, the number of the carrying palette for sorting and the number of the corresponding radio incoming information display apparatus and the delivery destination zip code are registered to the RFID reader/radio communications apparatus. Next, in step 72, the sorting worker holds with his/her hands a delivery article such as parcel post to be sorted for delivery. In step 73, radio waves/magnetic fields radiated from the RFID reader/radio communications apparatus are used to automatically read various information registered to the RFID label affixed on the delivery article such as parcel post, for example delivery request registration number and the address and the name of a receiver.

In step 74, the delivery destination zip code is identified from the read information and a signal is sent to radio incoming information display apparatus that corresponds to the zip code. In step 75, the radio incoming information display apparatus receives the signal and causes the pilot (guidance) lamp to blink. In step 76, the sorting worker visually checks blinking of the pilot lamp on the radio incoming information display apparatus and puts away the delivery article such as parcel post in the corresponding carrying palette for sorting. In step 77, whether the delivery sorting is complete or not is determined. In case not, control returns to step 72 and steps 72 through 76 are repeated until the delivery sorting is complete. In case the delivery sorting is complete, the flow is terminated.

Second Embodiment

Figure 8:
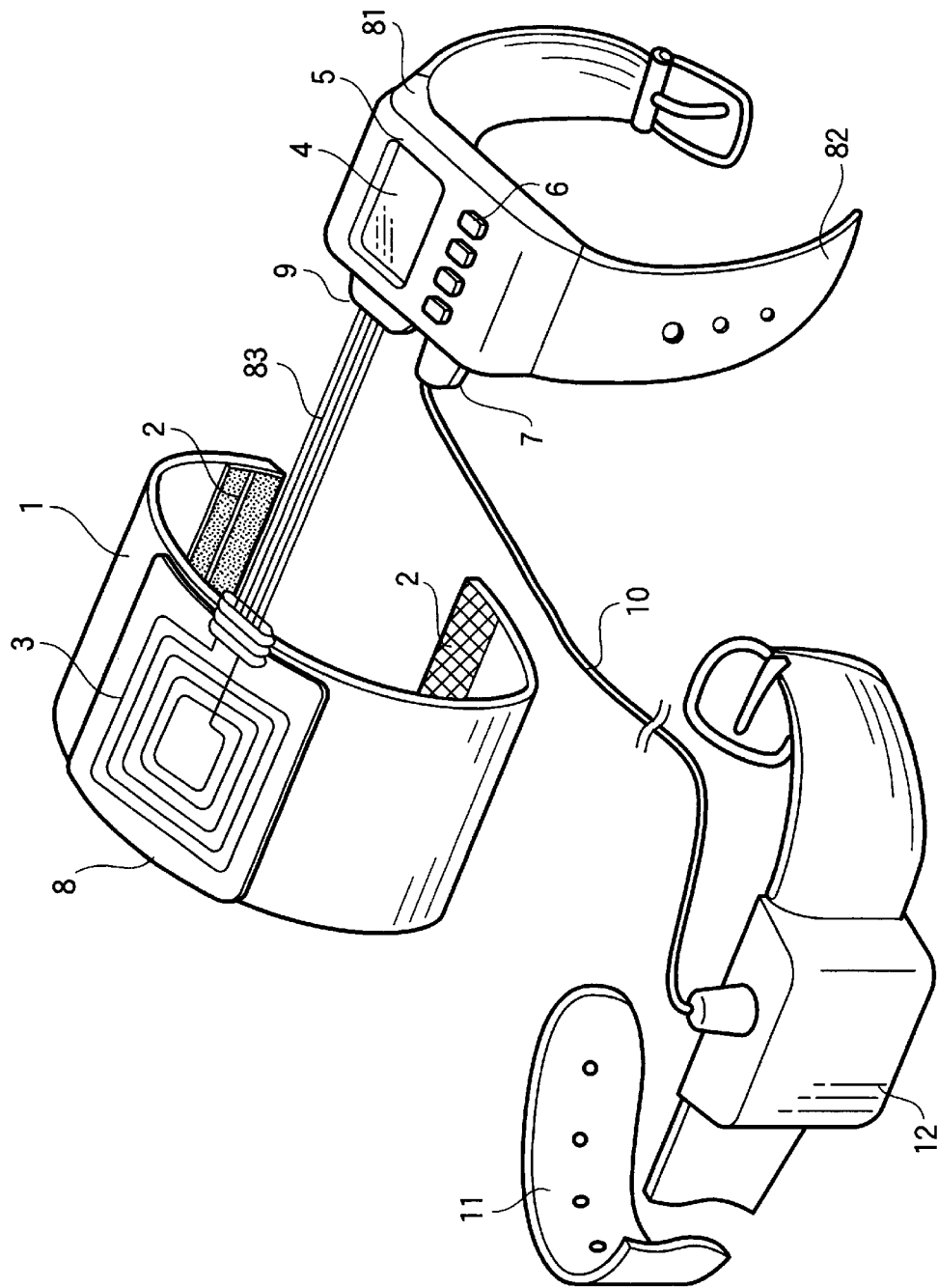
FIG. 8 is a schematic view of RFID reader/radio communications apparatus according to the second embodiment of the invention.

FIG. 8 is a schematic view of RFID reader/radio communications apparatus according to the second embodiment of the invention. In FIG. 8, the RFID reader/radio communications apparatus is separately composed of a watch-type main unit enclosure 81 provided on a watch-type wrist belt 82 that is attachable to an arm of a worker, a flexible antenna 3 provided on an arm belt 1, and a connection cable 83 that electrically connects the enclosure 81 and the antenna 3. On the inner surface of the arm belt 1 where the flexible antenna 3 is mounted is provided a fabric fastener 2. On the outer surface of the arm belt 1 is composed of the flexible antenna 3 with a flexible substrate 8 having an antenna circuit pattern printed thereon, glued to the arm belt 1 with metallic foils laminated.

The watch-type main unit enclosure 81 provided on the watch-type wrist belt 82 is provided with a display 4 such as an LCD, a control circuit 5 composed of a CPU, operation buttons 6, and a power supply 7 that constitute RFID reader/radio communications apparatus. The power supply 7 is connected via a feeder cable 10 to power feeding means 12 attached to a waist belt 11.

Figure 9:
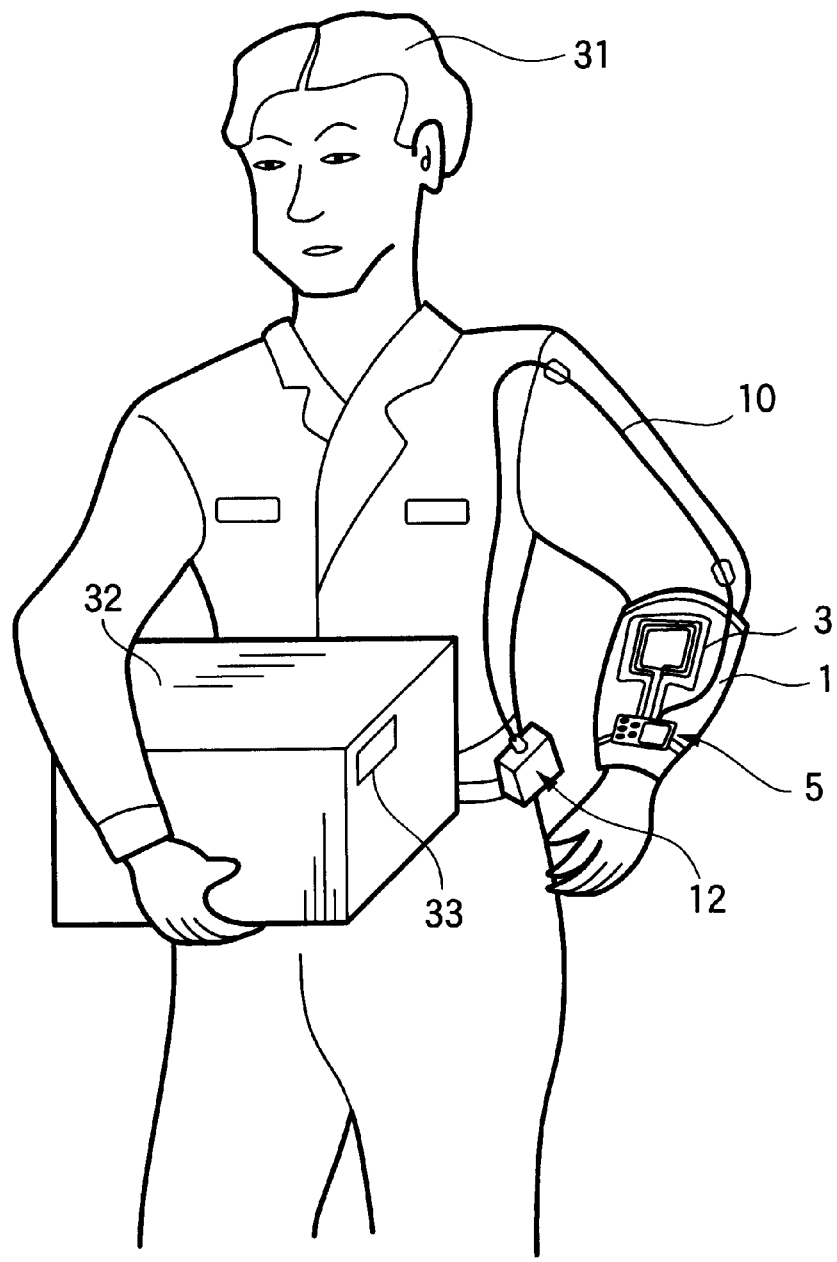
FIG. 9 shows the sorting of delivery articles such as parcel post with RFID reader/radio communications apparatus according to the second embodiment attached to a sorting worker.

FIG. 9 shows the sorting of delivery articles such as parcel post with RFID reader/radio communications apparatus according to the second embodiment shown in FIG. 8 attached to a sorting worker. In FIG. 9, the RFID reader/radio communications apparatus, as shown in FIG. 8, is separately composed of a watch-type main unit enclosure 81 provided on a watch-type wrist belt 82, a flexible antenna 3 provided on an arm belt 1, and a connection cable that electrically connects the enclosure 81 and the antenna 3. These components are attached to an arm of a sorting worker 31 and power is fed from power feeding means 12 attached to a waist belt to the power supply section 7 of the watch-type main unit enclosure 81.

When the sorting worker 31 brings the RFID reader/radio communications apparatus close to an RFID label 33 affixed on a delivery article 32 such as parcel post while lifting up the delivery article 32 such as parcel post with his/her arms, the sorting work information registered to the RFID label 33 is read and sent to radio incoming information display apparatus (not shown) via radio communications apparatus. The sorting worker 31 puts.away delivery articles such as parcel post in carrying palettes for sorting according to the blinking of the guidance lamp on the radio incoming information display apparatus.

Figure 10:
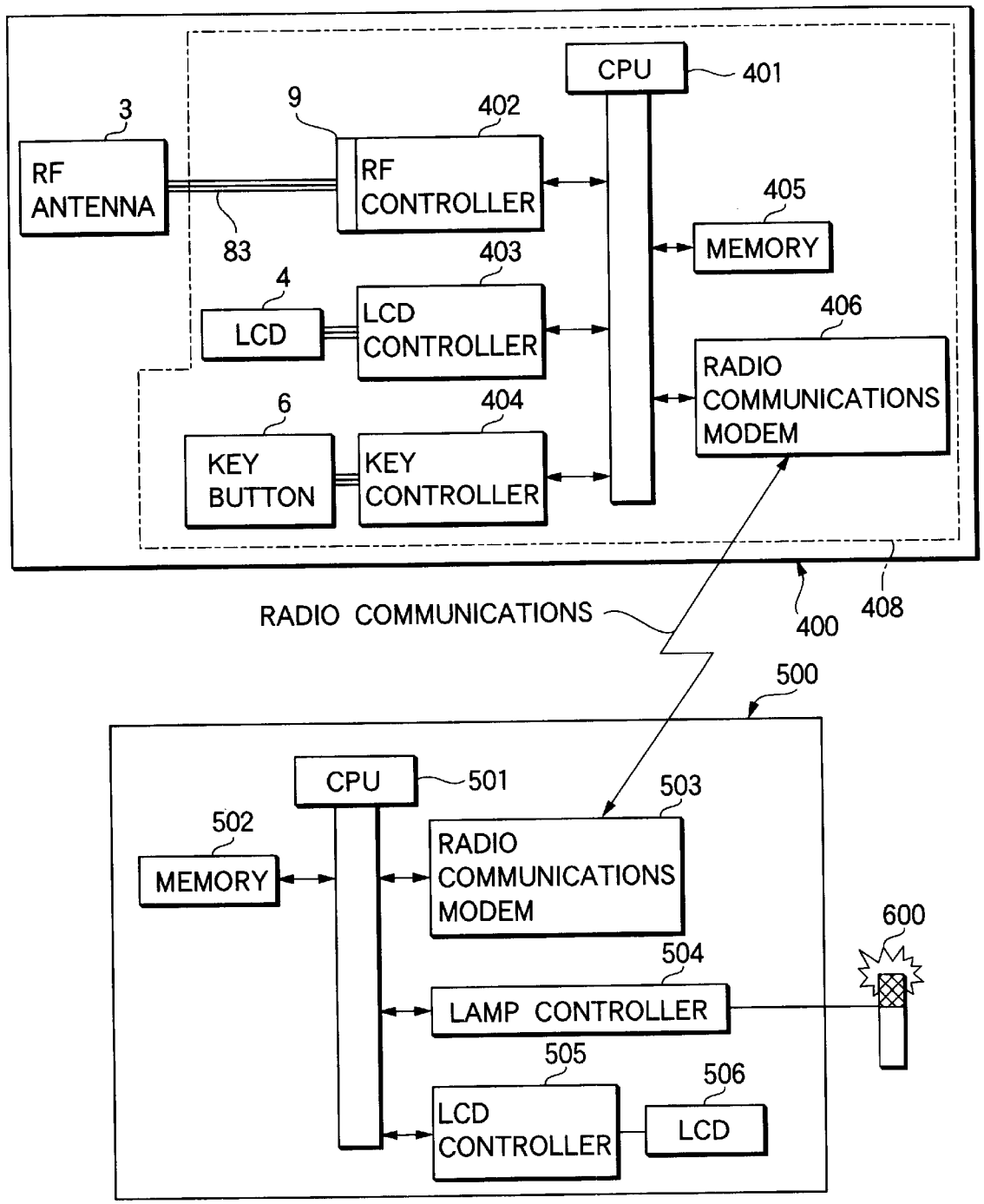
FIG. 10 is a block diagram of RFID reader/radio communications apparatus according to the second embodiment of the invention and a block diagram of a radio incoming information terminal.

FIG. 10 is a block diagram of RFID reader/radio communications apparatus according to the second embodiment of the invention and a block diagram of a radio incoming information terminal. This configuration is basically the same as that shown in FIG. 4 except that an RF controller 402 for controlling the RFID communication antenna (flexible antenna) 3 comprises a connector 9 for connection via a connection cable 83 and that the RFID reader/radio communications apparatus is accommodated in the watch-type main unit enclosure 408 except the RFID communication antenna (flexible antenna) 3 and the connection cable 83. Thus the corresponding explanation is omitted.

In this way, the RFID reader/radio communications apparatus according to the second embodiment is separately composed of a watch-type main unit enclosure 81 provided on a watch-type wrist belt 82 that is attachable to an arm of a worker, a flexible antenna 3 provided on an arm belt 1, and a connection cable 83 that electrically connects the enclosure 81 and the antenna 3. This increases the freedom of apparatus attachment on an arm of a sorting worker and freedom of apparatus configuration.

Third Embodiment

Figure 11:
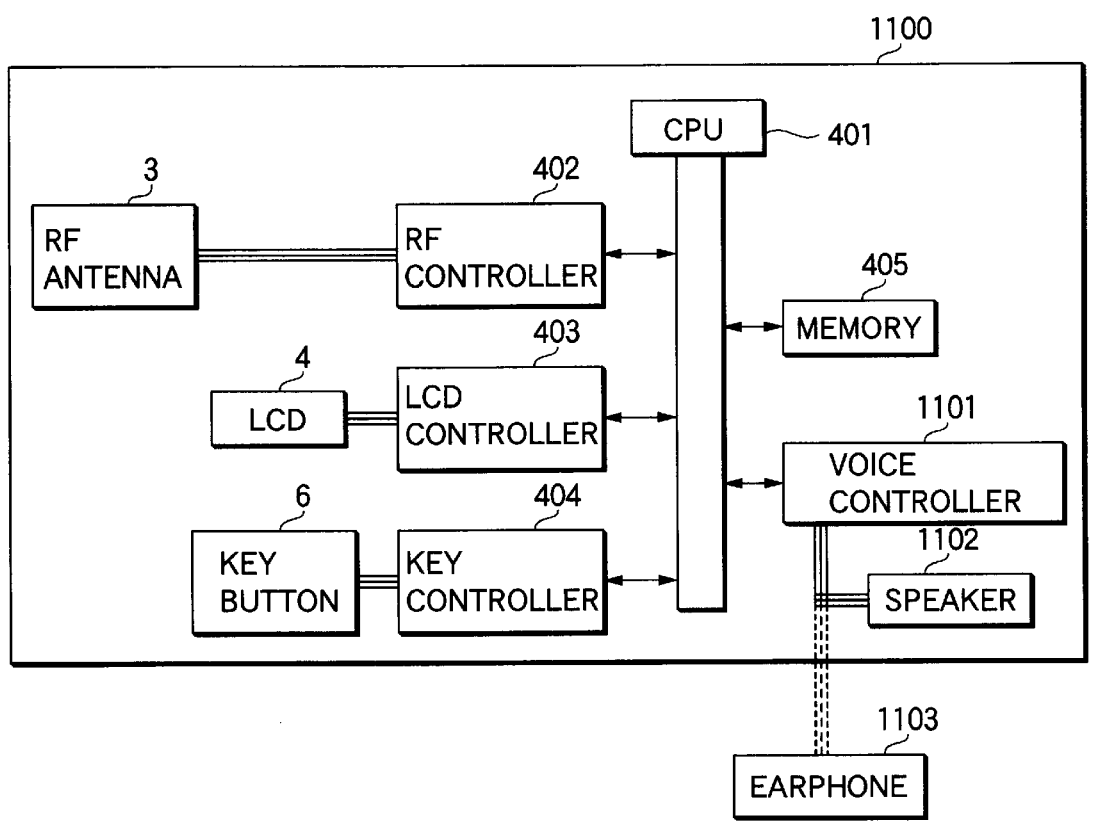
FIG. 11 is a block diagram of RFID reader/voice communications apparatus according to the third embodiment.

FIG. 11 is a block diagram of RFID reader/voice communications apparatus according to the third embodiment of the invention. Instead of the radio communications modem 406 in the configuration of the RFID reader/radio communications apparatus according to the first embodiment of the invention, the RFID reader/voice communications apparatus comprises a voice controller 1101 and a speaker 1102 or an earphone connected there to. These components constitute an integral functional block as RFID reader/voice communications apparatus 1100 except for a case where the RFID reader/voice communications apparatus 1100 comprises the earphone 1103.

Figure 12:
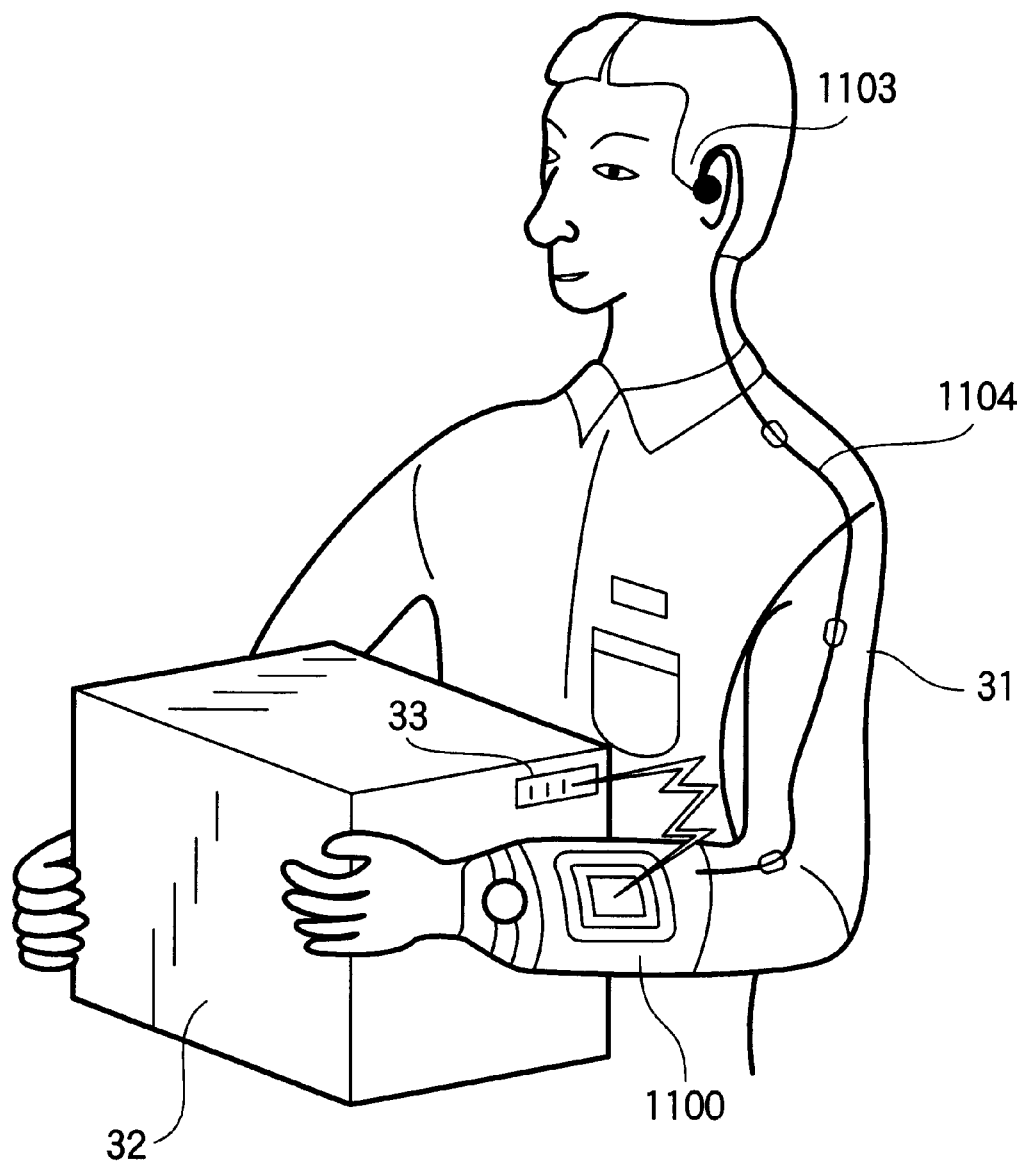
FIG. 12 shows the sorting of delivery articles such as parcel post with RFID reader/radio communications apparatus according to the third embodiment attached to a sorting worker.

FIG. 12 shows the sorting of delivery articles such as parcel post with RFID reader/radio communications apparatus according to the third embodiment shown in FIG. 11 attached to a sorting worker. In FIG. 12, the RFID reader/voice communications apparatus 1100 mounted on the arm belt 1 is attached to an arm of a sorting worker 31 and power is fed from the power feeding means attached to the waist belt (not shown) When the sorting worker 31 brings the RFID reader/radio communications apparatus close to an RFID label 33 affixed on a delivery article 32 such as parcel post while lifting up the delivery article 32 such as parcel post with his/her arms, the sorting work information registered to the RFID label 33 is read and a guidance instruction is sent via voice to the earphone 1103 by way of an earphone cable 1104. The sorting worker 31 puts away delivery articles such as parcel post in carrying palettes for sorting according to this guidance instruction.

While a guidance instruction via voice is directly given to the earphone 1103 in the example of FIG. 12, it is clear that the voice may be output from the speaker 1102 as shown in FIG. 11 and the sorting worker may directly hear the voice with his/her ears and put away delivery articles such as parcel post in carrying palettes for sorting.

In this way, for RFID reader/voice communications apparatus according to the first embodiment, the information on the RFID label affixed on the delivery article is read via RFID reader/voice communications apparatus attached to an arm of a worker in case the worker has lifted up the delivery article. Destination information in the read information is used to determine the carrying palette for sorting where the delivery article is to be put away for voice guidance. This configuration has an advantage that even an unskilled worker can perform sorting work correctly.

Fourth Embodiment

Figure 13:
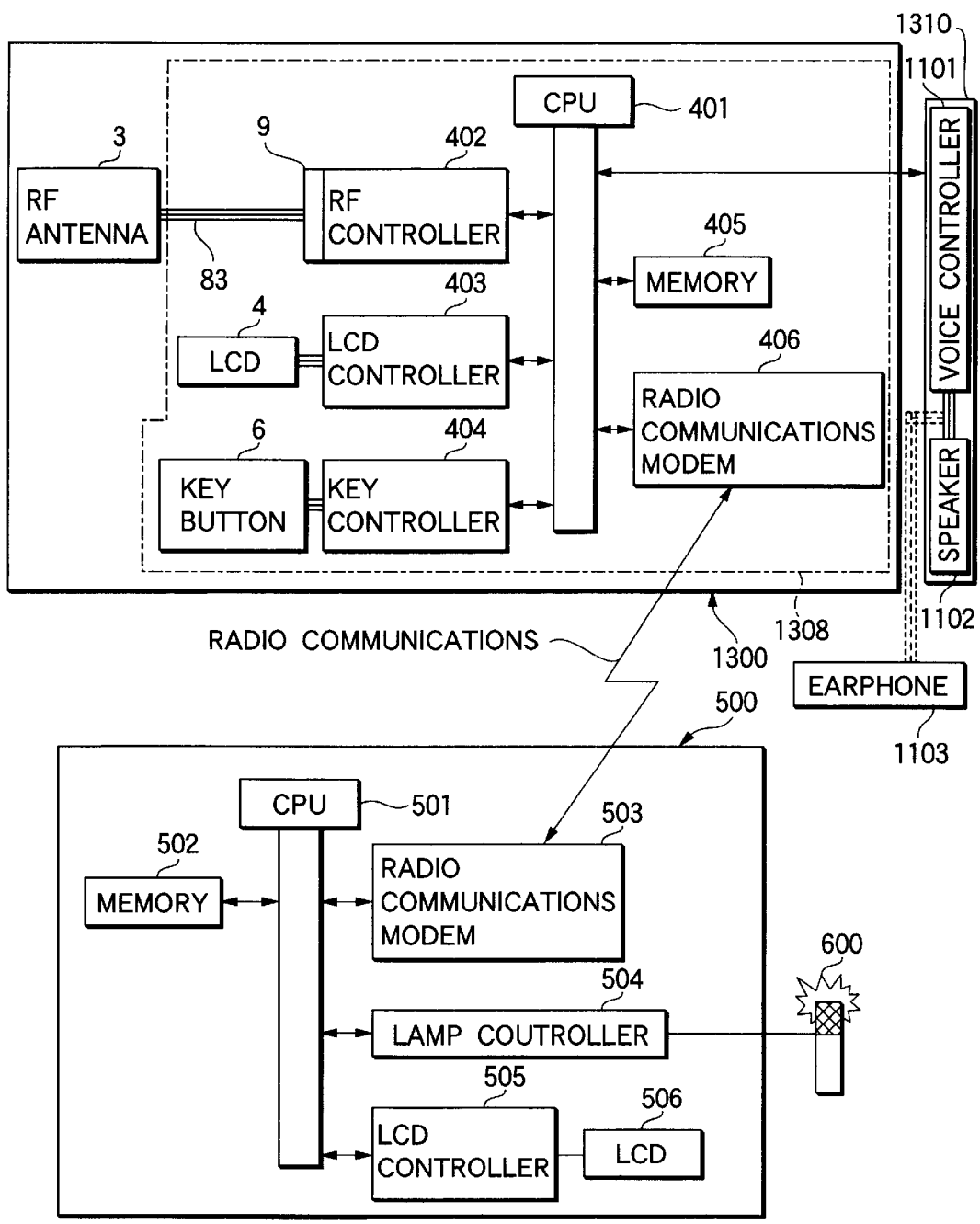
FIG. 13 is a block diagram of RFID reader/communications apparatus according to the fourth embodiment of the invention and a block diagram of a radio incoming information terminal.

FIG. 13 is a block diagram of RFID reader/communications apparatus according to the fourth embodiment of the invention and a block diagram of a radio incoming information terminal. This configuration differs from the configuration of the RFID reader/voice communications apparatus 1100 in that a voice controller 1101 and a speaker 1102 or an earphone 1103 connected thereto are provided as a separate functional block serving as a voice announcement section 1310 and that a watch-type main unit enclosure 1308 is provided, the same as the block diagram of the RFID reader/radio communications apparatus according to the second embodiment shown in FIG. 10. The voice controller 1101 of the voice announcement section 1310 and the CPU 401 in the watch-type main unit enclosure 1308 is electrically connected via a cable.

In this way, the RFID reader/communications apparatus according to the fourth embodiment is equipped with both the function of RFID reader/voice communications apparatus and the function of RFID reader/radio communications apparatus and serves as more excellent RFID reader/communications apparatus having both merits, thus allowing correct and quick sorting work.

As understood from the foregoing explanation, the first aspect of the invention is RFID reader/communications apparatus comprising a power feeding section attached to a waist belt for feeding power, a flexible antenna provided on an arm belt, a power supply section provided on the arm belt for receiving power from the power feeding section, and a control circuit for controlling the RFID reader/communications apparatus main unit provided on the arm belt. This configuration has an advantage that even an unskilled worker with the arm belt attached on his/her arm can perform sorting work correctly.

The second aspect of the invention is RFID reader/communications apparatus according to the first aspect of the invention, wherein the flexible antenna includes a flexible substrate an antenna circuit pattern printed on the flexible substrate, and wherein the flexible substrate is glued to an arm belt via flexible adhesive. The apparatus, attached to an arm of a sorting worker that handles delivery articles, flexibly keeps up with the movement of the arm.

The third aspect of the invention is RFID reader/communications apparatus according to the second aspect of the invention, further comprising a connection cable connecting the control circuit with the antenna circuit pattern. The apparatus, attached to an arm of a sorting worker that handles delivery articles, flexibly keeps up with the movement of the arm.

The fourth aspect of the invention is a delivery article handling method comprising steps of reading information such as the delivery request registration number and the address and the name of a receiver registered to the RFID label affixed on a delivery article, determining carrying palette for sorting in which the delivery article is to be put away based on this information, sending the determination result to radio incoming information display apparatus attached to the carrying palette for sorting via radio communications apparatus, and notifying the carrying palette for sorting where the delivery article is to be put away to a worker. This method has an advantage that information on the RFID label attached to the delivery article is read via RFID reader/radio communications apparatus and the carrying palette for sorting where the delivery article is to be put away is determined via destination information in the information for guidance via radio communications, thus allowing even an unskilled worker to perform sorting work correctly.

The fifth aspect of the invention is a delivery article handling system comprising RFID reader/radio communications apparatus including an RFID communication antenna in a flexible belt that can be attached to an arm of a delivery article sorting worker, an RFID label affixed on a delivery article where information such as the delivery request registration number and the address and the name of a receiver is registered, carrying palettes for sorting that accommodate the delivery articles by sorting and carrying the delivery articles, and radio incoming information display apparatus attached to the carrying palette for sorting having a guidance lamp that blinks, wherein the RFID reader/radio communications apparatus reads various information registered to the RFID label, determines carrying palette for sorting in which the delivery article is to be put away based on this information, and sends the determination result to the radio incoming information display apparatus attached to the carrying palette for sorting via the radio communications apparatus, and wherein the radio incoming information display apparatus receives the determination result and causes the guidance lamp to blink and notifies the carrying palette for sorting where the delivery article is to be put away to the worker. This system has an advantage that information on the RFID label attached to the delivery article is read via radio communications apparatus and the target carrying palette for sorting is determined via destination information in the read information for guidance via radio communications, thus allowing even an unskilled worker to perform sorting work correctly.

The sixth aspect of the invention is RFID reader/communications apparatus comprising a power feeding section attached to a waist belt for feeding power, a flexible antenna whose flexible substrate having a antenna circuit pattern printed on the flexible substrate is glued to a first arm belt via flexible adhesive, a control circuit for controlling the RFID reader/communications apparatus main unit provided on a second arm belt, a connection cable for connecting the control circuit with the flexible antenna, and a power supply section provided on the at least one of the first and second arm belt for receiving power from the power feeding section. This configuration has an advantage that the apparatus is separately composed of an antenna glued to an arm belt and a connection cable for connecting the control circuit with the flexible antenna so as to increase the freedom of apparatus attachment on an arm of a sorting worker and freedom of apparatus configuration.

The seventh aspect of the invention is a delivery article handling method comprising a step for reading information such as the delivery request registration number and the address and the name of a receiver registered to the RFID label affixed on a delivery article, a step for determining carrying palette for sorting in which the delivery article is to be put away based on this information, and a step for giving a sorting guidance via voice on the carrying palette for sorting where the delivery article is to be put away. This method has an advantage that information on the RFID label attached to the delivery article is read via RFID reader/voice communications apparatus attached to an arm of a delivery article sorting worker and the carrying palette for sorting where the delivery article is to be put away is determined via destination information in the information for guidance via voice, thus allowing even an unskilled worker to perform sorting work correctly.

The eighth aspect of the invention is a delivery article handling system comprising RFID reader/voice communications apparatus including an RFID communication antenna in a flexible belt that can be attached to an arm of a delivery article sorting worker, an RFID label affixed on a delivery article where information such as the delivery request registration number and the address and the name of a receiver is registered, and carrying palettes for sorting that accommodate the delivery articles by sorting and carry the delivery articles, wherein the RFID reader/voice communications apparatus reads various information registered to the RFID label, determines carrying palette for sorting in which the delivery article is to be put away by using this information, and giving a sorting guidance via voice on the carrying palette for sorting where the delivery article is to be put away. This method has an advantage that information on the RFID label attached to the delivery article is read via RFID reader/voice communications apparatus attached to an arm of a delivery article sorting worker and the carrying palette for sorting where the delivery article is to be put away is determined via destination information in the information for guidance via voice, thus allowing even an unskilled worker to perform sorting work correctly.

The ninth aspect of the invention is a delivery article handling method comprising a step for reading information such as the delivery request registration number and the address and the name of a receiver registered to the RFID label affixed on a delivery article, a step for determining carrying palette for sorting in which the delivery article is to be put away by using this information, a step for giving a sorting guidance via voice communications apparatus on the carrying palette for sorting where the delivery article is to be put away, a step for sending the determination result to radio incoming information display apparatus attached to the carrying palette for sorting via radio communications apparatus, and giving a guidance via blinking of the guidance lamp on the radio incoming information display apparatus. This method has an advantage that the RFID reader/communications apparatus is equipped with both the function of RFID reader/voice communications apparatus and the function of RFID reader/radio communications apparatus and serves as more excellent RFID reader/communications apparatus having both merits, thus allowing correct and quick sorting work.

The tenth aspect of the invention is a delivery article handling system comprising RFID reader/communications apparatus including an RFID communication antenna in a flexible belt that can be attached to an arm of a delivery article sorting worker, an RFID label affixed on a delivery article where information such as the delivery request registration number and the address and the name of a receiver is registered, carrying palettes for sorting that accommodate the delivery articles by sorting and carry the delivery articles, and radio incoming information display apparatus attached to the carrying palette for sorting having a guidance lamp that blinks, wherein the RFID reader/communications apparatus has a reader/radio communications function and a reader/voice communications function and reads various information registered to the RFID label, determines in which carrying palette for sorting the delivery article is to be put away by using this information, and gives a sorting guidance via voice communications apparatus on the carrying palette for sorting where the delivery article is to be put away, and sends the determination result to radio incoming information display apparatus attached to the carrying palette for sorting via radio communications apparatus, wherein the radio incoming information display apparatus receives the determination result to cause the guidance lamp to blink and wherein the worker puts away a delivery article in the carrying palette for sorting according to the sorting guidance via voice and the sorting guidance via a lamp. This system has an advantage that the RFID reader/communications apparatus is equipped with both the function of RFID reader/voice communications apparatus and the function of RFID reader/radio communications apparatus and serves as more excellent RFID reader/communications apparatus having both merits, thus allowing correct and quick sorting work.

What is claimed is:

1. RFID reader/communications apparatus comprising:
   a power feeding section attached to a waist belt for feeding power;
   a flexible antenna provided on an arm belt;
   a power supply section provided on the arm belt for receiving power from the power feeding section; and
   a control circuit provided on the arm belt for controlling the RFID reader/communications apparatus.

2. RFID reader/communications apparatus according to claim 1,
   wherein the flexible antenna includes a flexible substrate and an antenna circuit pattern printed on the flexible substrate,
   wherein the flexible substrate is glued to an arm belt via flexible adhesive.

3. RFID reader/communications apparatus according to claim 2 further comprising a connection cable connecting the control circuit with the antenna circuit pattern.

4. A delivery article handling method comprising steps of:
   reading information registered to an RFID label affixed on a delivery article;
   determining a carrying palette in which the delivery article is to be put away based on the information registered to the RFID label;

sending the determination result to a radio incoming information display apparatus attached to the carrying palette via a radio communications apparatus; and notifying a worker of the carrying palette where the delivery article is to be put away.

5. A delivery article handling system comprising:

an RFID reader/radio communications apparatus including an RFID communication antenna in a flexible belt that can be attached to an arm of a delivery article sorting worker;

an RFID label affixed on a delivery article where information is registered;

a plurality of carrying palettes that accommodate the delivery article by sorting and carrying a plurality of delivery articles; and a plurality of radio incoming information display apparatuses, each radio incoming information display apparatus being attached to a corresponding carrying palette, each radio information display apparatus having a guidance lamp;

wherein the RFID reader/radio communications apparatus reads information registered to the RFID label, determines a specific carrying palette in which the delivery article is to be put away based on the information registered to the RFID label, and further wherein the RFID reader/radio communications apparatus sends the determination result to a corresponding radio incoming information display apparatus attached to the specific carrying palette via the radio communications apparatus, wherein the radio incoming information display apparatus receives the determination result, causes the guidance lamp to blink, and thereby notifies the worker of the specific carrying palette where the delivery article is to be put away.

6. RFID reader/communications apparatus comprising:

a power feeding section attached to a waist belt for feeding power;

a flexible antenna whose flexible substrate having a printed antenna circuit pattern thereon is glued to a first arm belt via flexible adhesive;

a control circuit provided on a second arm belt for controlling the RFID reader/communications apparatus main unit;

a connection cable for connecting the control circuit with the flexible antenna, and;

a power supply section provided on at least one of the first and second arm belt for receiving power from the power feeding section.

7. A delivery article handling method comprising the steps of:

reading information registered to an RFID label affixed on a delivery article;

determining a carrying palette in which the delivery article is to be put away based on the information registered to the RFID label; and giving a sorting guidance via voice on the carrying palette where the delivery article is to be put away.

8. A delivery article handling system comprising:

an RFID reader/voice communications apparatus including an RFID communication antenna in a flexible belt that can be attached to an arm of a delivery article sorting worker;

a plurality of RFID labels, each for registering information; and a plurality of carrying palettes that accommodate a plurality of delivery articles by sorting and carrying the delivery articles, each delivery article having an RFID label affixed;

wherein the RFID reader/voice communications apparatus reads the information registered to the RFID label on a specific delivery article chosen from the plurality of delivery articles, determines a particular carrying palette from the plurality of carrying palettes in which the specific delivery article is to be put away by using the information, and giving a sorting guidance via voice on the particular carrying palette for sorting where the delivery article is to be put away.

9. A delivery article handling method comprising steps of:

reading information registered to an RFID label affixed on a delivery article;

determining a carrying palette in which the delivery article is to be put away by using the information;

giving a sorting guidance via a voice communications apparatus on the carrying palette where the delivery article is to be put away;

sending the determination result to a radio incoming information display apparatus attached to the carrying palette via a radio communications apparatus; and giving a guidance via blinking of a guidance lamp on the radio incoming information display apparatus.

10. A delivery article handling system comprising:

an RFID reader/communications apparatus including an RFID communication antenna in a flexible belt that can be attached to an arm of a delivery article sorting worker;

an RFID label affixed on a delivery article where information is registered;

a carrying palette that accommodates the delivery article by sorting and carrying the delivery article; and a radio incoming information display apparatus attached to the carrying palette, the radio incoming information display apparatus having a guidance lamp;

wherein the RFID reader/communications apparatus reads various information registered to the RFID label, determines in which carrying palette the delivery article is to be put away by using this information, gives a sorting guidance via voice communications apparatus on the carrying palette where the delivery article is to be put away, and sends the determination result to the radio incoming information display apparatus attached to the carrying palette via a radio communications apparatus, wherein the radio incoming information display apparatus receives the determination result to cause the guidance lamp to blink, and wherein the worker puts away a delivery article in the carrying palette according to the sorting guidance via voice and the sorting guidance via a lamp.

11. An RFID reader/communications apparatus comprising:

a power feeding section attached to a waist belt for feeding power;

a flexible antenna provided on an arm belt, said flexible antenna for radio frequency communication with an RFID label on a delivery article, said flexible antenna also for radio frequency communication with an incoming information display apparatus on a palette;

a power supply section provided on the arm belt for receiving power from the power feeding section; and a control circuit provided on the arm belt for controlling the RFID reader/communications apparatus.

12. The RFID reader/communications apparatus according to claim 10, wherein the flexible antenna includes a flexible substrate and an antenna circuit pattern printed on the flexible substrate, wherein the flexible substrate is glued to an arm belt via flexible adhesive.

13. The RFID reader/communications apparatus according to claim 12, further comprising a connection cable connecting the control circuit with the antenna circuit pattern.

* * * * *